(12) United States Patent
Okamoto et al.

(10) Patent No.: US 11,238,007 B2
(45) Date of Patent: Feb. 1, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Takuya Okamoto, Kanagawa (JP); Toshiyuki Komoda, Kanagawa (JP); Shinsuke Nakazawa, Kanagawa (JP); Yoshihito Suezawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 103 days.

(21) Appl. No.: 16/155,085

(22) Filed: Oct. 9, 2018

(65) Prior Publication Data

US 2019/0121862 A1 Apr. 25, 2019

(30) Foreign Application Priority Data

Oct. 23, 2017 (JP) .............................. JP2017-204469

(51) Int. Cl.
*G06F 16/00* (2019.01)
*G06F 3/0482* (2013.01)
*G06F 3/0483* (2013.01)

(52) U.S. Cl.
CPC ............ *G06F 16/00* (2019.01); *G06F 3/0482* (2013.01); *G06F 3/0483* (2013.01)

(58) Field of Classification Search
CPC ....................................................... G06F 16/00
See application file for complete search history.

(56) References Cited

U.S. PATENT DOCUMENTS

| | | | | |
|---|---|---|---|---|
| 6,262,732 B1* | 7/2001 | Coleman | ............... | G06F 40/166 715/835 |
| 2002/0091739 A1* | 7/2002 | Ferlitsch | ............. | G06F 3/04815 715/273 |
| 2005/0283742 A1* | 12/2005 | Gusmorino | ......... | G06F 3/04817 715/839 |
| 2006/0036568 A1* | 2/2006 | Moore | ................... | G06F 16/168 |
| 2008/0307364 A1* | 12/2008 | Chaudhri | ............ | G06F 3/04842 715/836 |
| 2009/0307626 A1* | 12/2009 | Jalon | ..................... | G06F 16/168 715/771 |

FOREIGN PATENT DOCUMENTS

| | | |
|---|---|---|
| JP | H05-265689 A | 10/1993 |
| JP | H06-119393 A | 4/1994 |
| JP | 2009-048450 A | 3/2009 |

OTHER PUBLICATIONS

Jun. 29, 2021 Office Action issued in Japanese Patent Application No. 2017-204469.

* cited by examiner

*Primary Examiner* — Roland J Casillas
(74) *Attorney, Agent, or Firm* — Oliff PLC

(57) ABSTRACT

An information processing apparatus includes a selector and a display controller. The selector selects a first display form or a second display form as a display form of a display image including a reduced image of a document. When the first display form is selected, the display controller controls display to make a distance between the reduced image of the document and document information of the document larger than the distance in a case where the second display form is selected.

6 Claims, 5 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-204469 filed Oct. 23, 2017.

BACKGROUND

(i) Technical Field

The present invention relates to an information processing apparatus and a non-transitory computer readable medium.

(ii) Related Art

There are various document management software applications known in the related art, which are capable of displaying, along with a document name, a reduced image of a document, that is, a thumbnail, so that contents of the document are recognizable by such a reduced image. The document name is typically presented directly under the corresponding thumbnail at a predetermined distance from the thumbnail.

Some of such document management software applications have a function of displaying an image that represents the thickness of the document and adding the image to the thumbnail when presenting the thumbnail so that the relative volume of the number of pages included in the document is recognized.

SUMMARY

According to an aspect of the invention, there is provided an information processing apparatus including a selector and a display controller. The selector selects a first display form or a second display form as a display form of a display image including a reduced image of a document. When the first display form is selected, the display controller controls display to make a distance between the reduced image of the document and document information of the document larger than the distance in a case where the second display form is selected.

BRIEF DESCRIPTION OF THE DRAWINGS

An exemplary embodiment of the present invention will be described in detail based on the following figures, wherein.

DETAILED DESCRIPTION

Hereinafter, an exemplary embodiment of the invention will be described with reference to the drawings.

Figure 1:
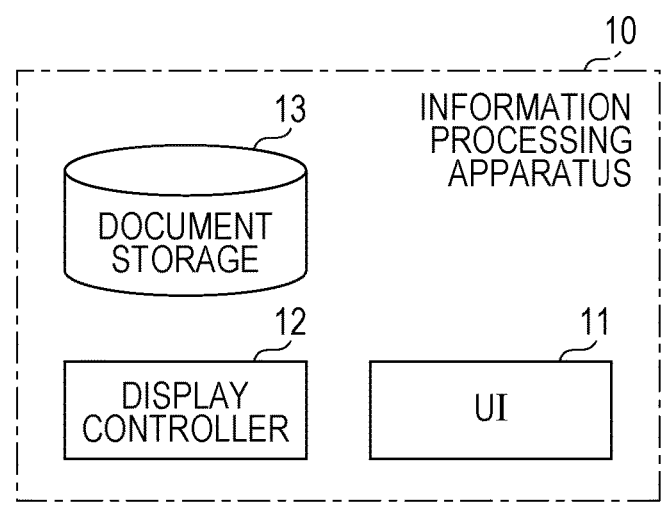
FIG. 1 is a block diagram depicting an information processing apparatus according to an exemplary embodiment of the invention.
Figure 2:
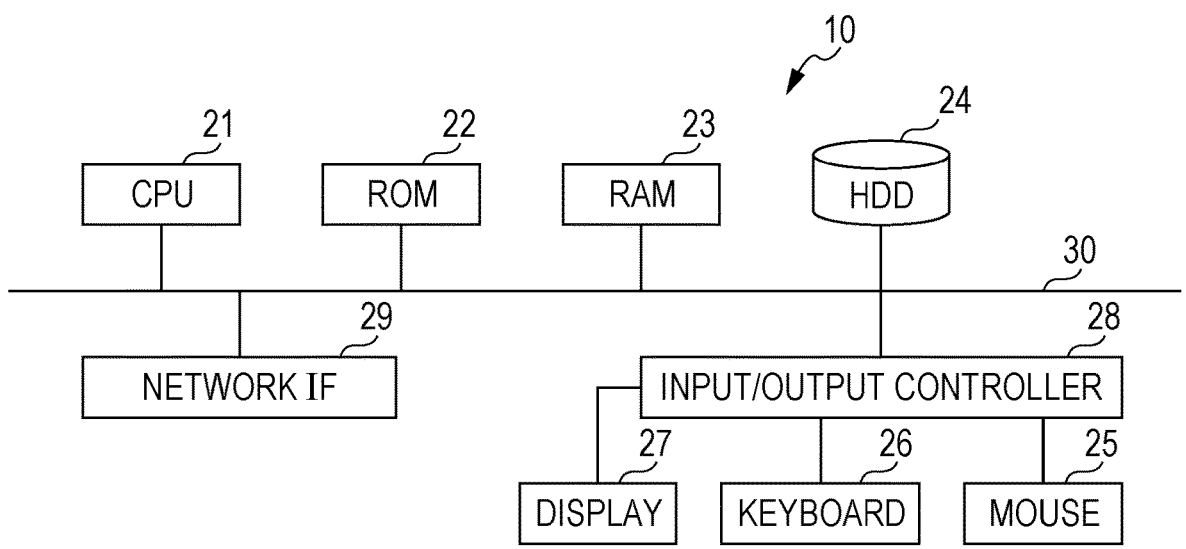
FIG. 2 illustrates a hardware configuration of a computer that constitutes the information processing apparatus according to this exemplary embodiment.

FIG. 1 is a block diagram depicting an information processing apparatus 10 according to the exemplary embodiment of the invention. FIG. 2 illustrates a hardware configuration of a computer that constitutes the information processing apparatus 10 according to this exemplary embodiment.

The information processing apparatus 10 according to this exemplary embodiment may be realized by using a computer having general-purpose hardware, such as a personal computer (PC). As depicted in FIG. 2, the information processing apparatus 10 is configured such that a central processing unit (CPU) 21, a read-only memory (ROM) 22, a random-access memory (RAM) 23, a hard disk drive (HDD) 24, an input/output controller 28, and a network interface (IF) 29 are connected to an internal bus 30. A mouse 25 and a keyboard 26, equipped as an input unit, and a display 27, equipped as a display unit, are each connected to the input/output controller 28. The network IF 29 is equipped as a communication unit. In an information processing apparatus using a liquid crystal display as a user interface, such as a tablet terminal, the liquid crystal display serves as an input unit and a display unit.

The information processing apparatus 10 according to this exemplary embodiment includes a user interface (UI) 11, a display controller 12, and a document storage 13 as depicted in FIG. 1. In FIG. 1, elements that are not used for description of this exemplary embodiment are omitted.

The user interface 11 is a user interface unit that receives information that is input by using the mouse 25 or the keyboard 26 and outputs information to the display 27 by using various screen images. This exemplary embodiment provides a first display form and a second display form as display forms of document thumbnails. The first display form is realized in a thickness display mode, and the second display form is realized in a thickness non-display mode. The user interface 11 serves as a selector that enables a user to select which display mode is used in presenting the document thumbnails. The display controller 12 realizes a function of a document management software application and performs display control to cause the user interface 11 to display thumbnails of documents stored in the document storage 13 and thumbnails of documents received via a network.

The document storage 13 stores document files to be displayed and document information such as attributes of the document files to be displayed. In this exemplary embodiment, the term, "document file", refers to not only a file that is constituted only by character sequences, which is a document file in a narrow sense, but also a file generated in such a way that an amount of contents in a document is countable in a unit such as pages. It is to be understood that the term, "document file", is used in a broad sense and may include not only character sequences, but also images such as drawings and photographs.

Each of the elements 11 and 12 in the information processing apparatus 10 is realized by cooperative operation between a computer that constitutes the information processing apparatus 10 and programs operating on the CPU 21 mounted in the computer. The document storage 13 is realized by using the HDD 24 mounted in the information processing apparatus 10. Alternatively, the document storage 13 may also be realized by using the RAM 23 or by using an external storage unit via a network.

The programs used in this exemplary embodiment may be provided by transmission via the communication unit or in a stored form in a recording medium readable by a computer, such as a compact-disc read-only memory (CD-ROM) or a Universal Serial Bus (USB) memory. The programs provided by using the communication unit or the recording medium are installed into the computer, and the CPU 21 of the computer executes the programs consecutively to realize various processes.

Figure 3:
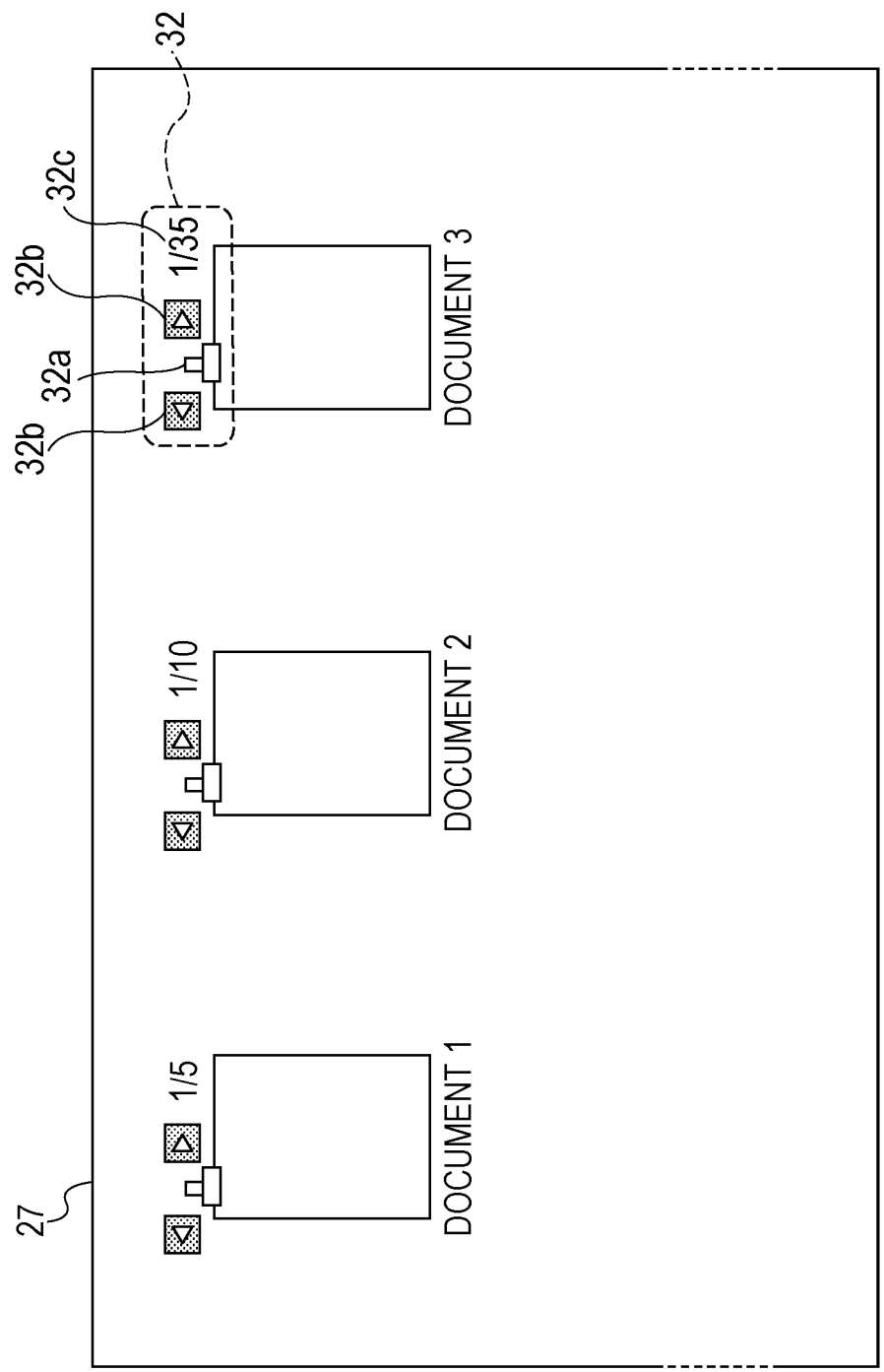
FIG. 3 illustrates an example presentation of thumbnails, which are presented in a thickness non-display mode according to this exemplary embodiment.
Figure 4:
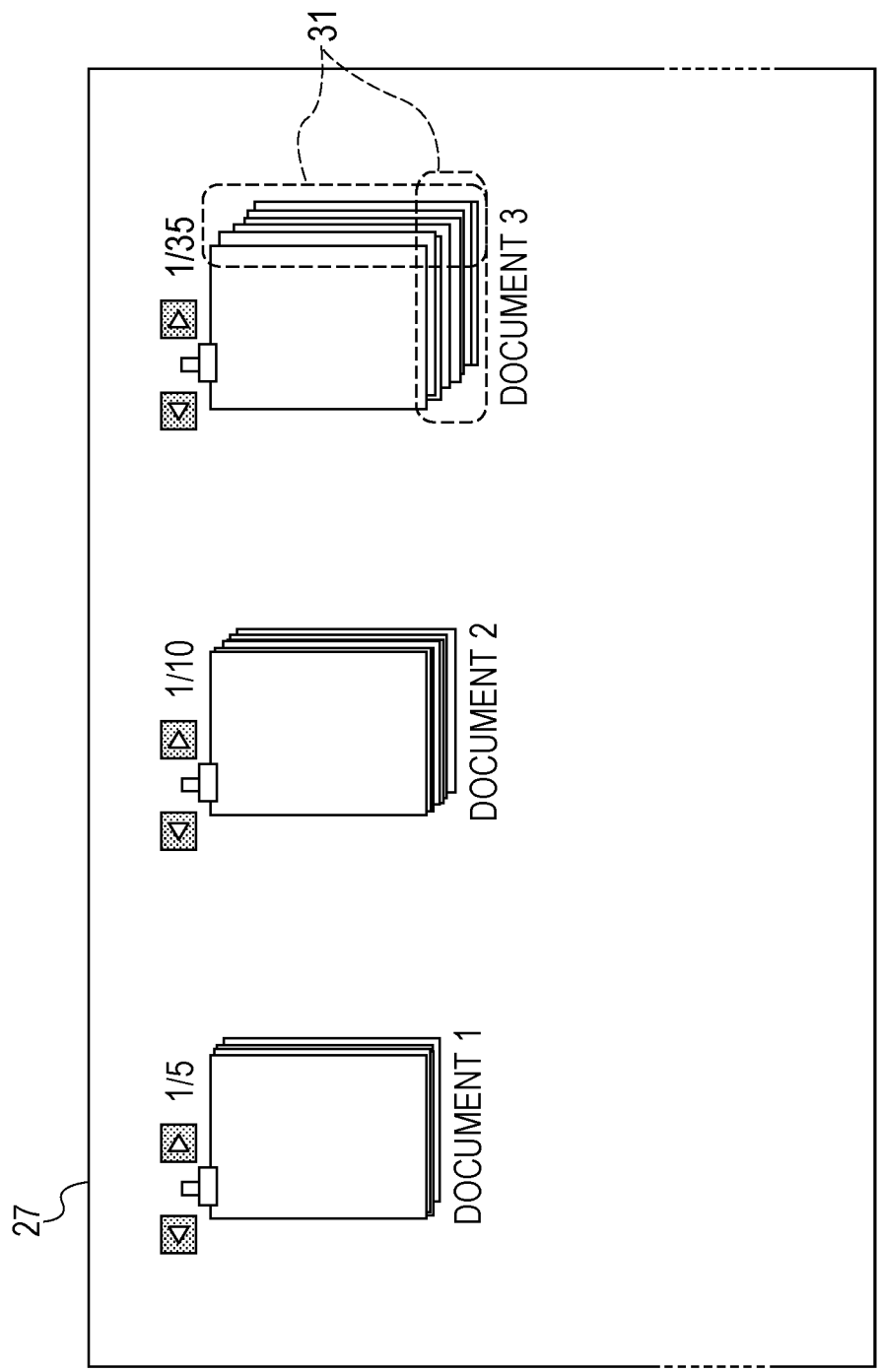
FIG. 4 illustrates an example presentation of thumbnails, which are subjected to display control according to this exemplary embodiment and presented in a thickness display mode.

This exemplary embodiment provides the thickness display mode and the thickness non-display mode as modes in which the thumbnails are presented. In the thickness display mode, a reduced image of a document is presented with a thickness image of the document added to the reduced image, and in the thickness non-display mode, the reduced image is presented without the thickness image of the document added. FIG. 3 illustrates an example presentation of documents presented on the display 27, and thumbnails are presented in the thickness non-display mode in this example presentation. FIG. 4 illustrates an example presentation of the same documents as in FIG. 3, which are presented on the display 27, and the thumbnails are presented in the thickness display mode in this example presentation. A comparison between FIG. 3 and FIG. 4 reveals that when a thumbnail is presented in the thickness display mode, an image representing the thickness of a document is presented in accordance with the number of pages in the document.

A document thumbnail is produced from a reduced image of a document. To be precise, the document thumbnail includes a reduced image of a document and accompanying images of the document that are optionally generated and added to the reduced image. In this exemplary embodiment, accompanying images 31 and 32 are presented. As depicted in FIG. 4, the accompanying image 31 is an image representing document thickness. A comparison among documents 1, 2, and 3 reveals that a thickness width, which is a width representing the document thickness, increases as the document becomes thicker, leading to easy visual recognition of an amount of contents in the document. The accompanying image 31 is not added to a document that only has one page. The accompanying image 32 is an image added to a document represented by a reduced image as depicted in FIG. 3 and may include a clip image 32a to bind multiple pages, buttons 32b to change a reduced image to be presented to the subsequent page or to the preceding page, and page information 32c presenting the total number of pages of the document and the page number of a current display image.

The accompanying image 31 representing thickness (hereinafter, referred to as a thickness image) represents the document thickness as described above. The document thickness, that is, the amount of contents in the document, is typically determined by the number of pages that constitute the document but not determined only by the number of pages. For example, when a sheet of A3 size is folded and bound into a document of A4 size, the number of pages does not increase, but the document thickness increases. In such a case, when a sheet of different size is folded and bound into a document, the thickness image 31 of the document may be presented by enlarging the thickness width of the thickness image 31. Other than presenting the amount of contents in the document described above, the thickness image 31 may represent information on, for example, the number of characters, the number of images, and the like. The thickness width of the thickness image 31 may be determined based on the overall consideration of such information.

Although a reduced image of a document may be generally called a "thumbnail", in this exemplary embodiment, as described above, a display image formed by adding accompanying images to a reduced image of a document is called a "thumbnail".

Figure 5:
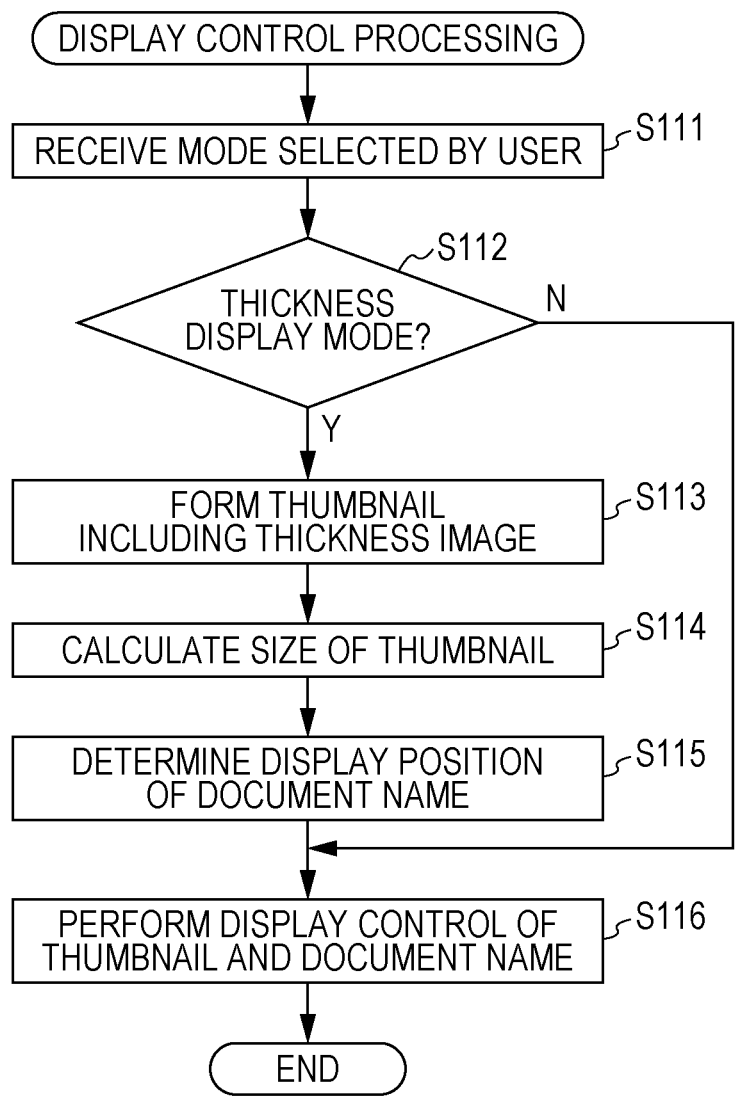
FIG. 5 is a flowchart illustrating characteristic display control processing according to this exemplary embodiment.

Display control processing by the display controller 12 according to this exemplary embodiment will be described with reference to a flowchart depicted in FIG. 5.

As described above, this exemplary embodiment provides the thickness display mode and the thickness non-display mode as the modes in which the thumbnails are presented. When a document is presented on the display 27, the user interface 11 enables a user to select which of the thickness display mode and the thickness non-display mode is used to present the thumbnail of the document by, for example, presenting a predetermined selection screen on the display 27. The mode selection performed by the user every time a document is presented may be omitted by setting in advance an initial setting of specifying which mode is used to present the document.

When a mode selected by the user is received (step S111) and the received mode is the thickness non-display mode (N in step S112), the display controller 12 causes the thumbnails and document names to be presented in the same manner as before (step S116). Specifically, as illustrated in FIG. 3, display control is performed so that a thumbnail is formed of a reduced image of each of the documents and the accompanying image 32 added to the reduced image, and further, a document name is presented directly under the thumbnail at a predetermined distance from the thumbnail.

In contrast, when the received mode is the thickness display mode (Y in step S112), the display controller 12 adds the accompanying image 32 to the reduced image of each of the documents, determines a thickness width of the thickness image 31 in accordance with the number of pages in the document or the like, and forms a thumbnail by adding the thickness image 31 to the reduced image (step S113). Subsequently, the display controller 12 calculates a size of the thumbnail, at least a length of the thumbnail in a direction in which the thumbnail and the document name are aligned (step S114). Thus, a display position of the bottom side of the thumbnail is identified, and a display position of the document name is determined so that the document name is presented at the predetermined distance from the bottom side of the thumbnail (step S115). In this way, the display controller 12 sets positional relationship of display between the thumbnail and the document name and performs display control to cause the user interface 11 to present the thumbnail and the document name (step S116).

Figure 6:
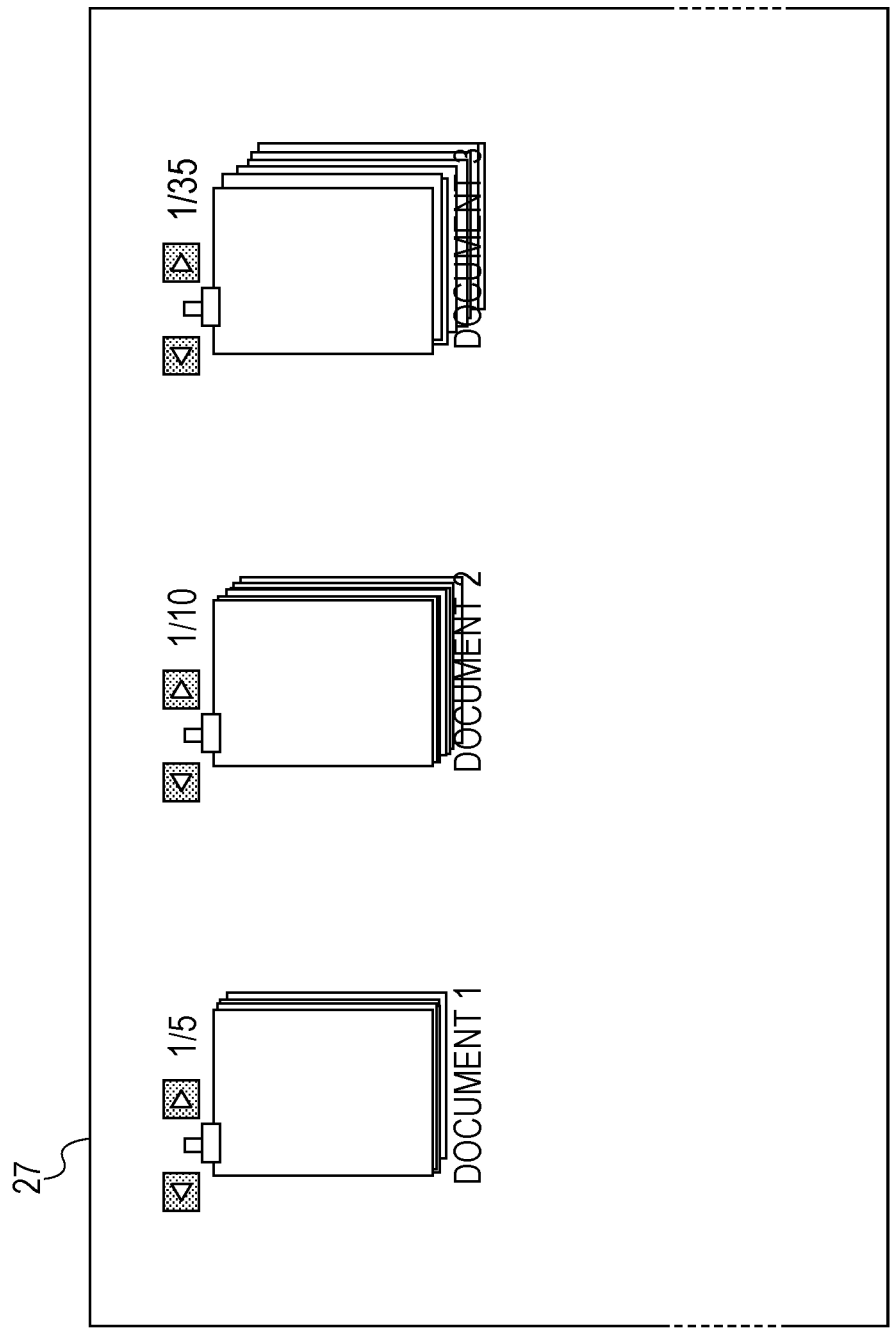
FIG. 6 illustrates an example presentation of thumbnails, which are not subjected to the display control according to this exemplary embodiment and presented in the thickness display mode.

FIG. 4 illustrates an example presentation of the documents, which are subjected to the display control processing described above and presented in the thickness display mode. FIG. 6 illustrates an example presentation of the documents, which are not subjected to the display control processing characteristic of this exemplary embodiment and presented. If the documents are not subjected to the display control processing according to this exemplary embodiment, each of the document names is presented at the predetermined distance from the bottom side of a corresponding one of the reduced images as illustrated in FIG. 6, and a space to be placed between each of the document names and a corresponding one of the thumbnails is missing. In particular, in a case of documents having a large number of pages, such as the documents 2 and 3, the thickness images 31 are presented superposed on the document names, and the document names are not recognizable or difficult to recognize.

In contrast, when the display control processing according to this exemplary embodiment is applied, the display controller 12 performs display control in such a manner that each of the reduced images of the documents and a corresponding one of the document names are placed with a distance therebetween when operated in the thickness display mode. In other words, the document names are presented at a distance from the reduced images, which is larger than the distance in the thickness non-display mode.

The document name is presented at a larger distance from the reduced image to avoid superposition of the thickness image 31 and the document name, and the distance between the thumbnail and the document name is adjusted for this purpose. In this exemplary embodiment, as illustrated in steps S113 to S115, the document names are controlled to be presented at the predetermined distance from the bottom edges of the thickness images 31, and thus it is ensured that the thickness images 31 and the document names are presented without superposition. In this way, when the thumbnails are presented in the thickness display mode, a distance to be kept between each of the thumbnails and the corresponding one of the document names is maintained in the same manner as presented in the thickness non-display mode.

In this exemplary embodiment, the first display form of a display image (thumbnail) of a document is a form in which a thumbnail formed of a reduced image of the document with an accompanying image placed in the area surrounding the reduced image is presented, and the thickness image 31 is described as an example of the accompanying image added to the reduced image. This is only an example. Instead of the thickness image 31, an accompanying image that extends from the reduced image of the document and is placed in the area surrounding the reduced image of the document, for example, an image such as a sticker, may be presented. In this exemplary embodiment, although the document names placed under the thumbnails are described as an example of display information presented at the predetermined distance from the thumbnails, document information may be other information relating to the documents, such as a document owner and production date and time. A position where the document information is placed is not limited to under the thumbnails, and the document information may be placed in the area surrounding the thumbnails, such as above the thumbnails or on the side of the thumbnails.

Although the display control processing characteristic of this exemplary embodiment is described by using thumbnails of documents as an example in this exemplary embodiment, the display control processing is applicable to a thumbnail that constitutes a kind of container, which may accommodate multiple documents, such as a binder formed of multiple documents bound together.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to:
receive a selection of a first display form or a second display form as a display form of a display image including a reduced image of a document, the first display form or the second display form being selected by a user;
when the first display form is selected, control display of a distance between the reduced image of the document and document information of the document to increase with an increase in thickness of the document; and
when the second display form is selected, control display of the document information to be presented at a predetermined distance from the document.

2. The information processing apparatus according to claim 1, wherein
the first display form is a form in which the reduced image of the document with an accompanying image placed in an area surrounding the reduced image is presented, and the second display form is a form in which the reduced image of the document without the accompanying image placed in the area surrounding the reduced image is presented.

3. The information processing apparatus according to claim 2, wherein
the accompanying image is an image representing document thickness.

4. The information processing apparatus according to claim 2, wherein
when the first display form is selected, the processor is programmed to adjust a distance between the display image and the document information of the document in such a manner that the accompanying image is not superposed on the document information of the document.

5. A non-transitory computer readable medium storing a program causing a computer to execute a process for information processing, the process comprising:
receiving a selection of a first display form or a second display form as a display form of a display image including a reduced image of a document, the first display form or the second display form being selected by a user;
when the first display form is selected, controlling display of a distance between the reduced image of the document and document information of the document to increase with an increase in thickness of the document; and
when the second display form is selected, controlling display of the document information to be presented at a predetermined distance from the document.

6. An information processing apparatus comprising:
means for receiving a selection of a first display form or a second display form as a display form of a display image including a reduced image of a document, the first display form or the second display form being selected by a user;

when the first display form is selected, means for controlling display of a distance between the reduced image of the document and document information of the document to increase with an increase in thickness of the document; and when the second display form is selected, means for controlling display of the document information to be presented at a predetermined distance from the document.

\* \* \* \* \*